(12) United States Patent
Wang et al.

(10) Patent No.: US 10,090,745 B2
(45) Date of Patent: Oct. 2, 2018

(54) VIBRATION MOTOR

(71) Applicants: Hongxing Wang, Shenzhen (CN); Rongguan Zhou, Shenzhen (CN); Lubin Mao, Shenzhen (CN)

(72) Inventors: Hongxing Wang, Shenzhen (CN); Rongguan Zhou, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 369 days.

(21) Appl. No.: 15/011,466

(22) Filed: Jan. 29, 2016

(65) Prior Publication Data

US 2017/0012518 A1    Jan. 12, 2017

(30) Foreign Application Priority Data

Jul. 9, 2015    (CN) .................... 2015 2 0495045 U

(51) Int. Cl.
*H02K 33/16*  (2006.01)
*H02K 16/02*  (2006.01)

(52) U.S. Cl.
CPC ............ *H02K 33/16* (2013.01); *H02K 16/02* (2013.01)

(58) Field of Classification Search
CPC ........ H02K 16/02; H02K 33/16; G04C 3/102; G04C 3/107; H03B 5/30
USPC ............................................. 310/10, 15, 25
See application file for complete search history.

(56) References Cited

U.S. PATENT DOCUMENTS

| | | | | |
|---|---|---|---|---|
| 8,410,642 B2* | 4/2013 | Dong | ..................... | H02K 33/16 310/25 |
| 8,456,042 B2* | 6/2013 | Dong | ..................... | H02K 33/16 310/15 |
| 8,624,450 B2* | 1/2014 | Dong | ..................... | H02K 33/16 310/15 |
| 9,614,425 B2* | 4/2017 | Jin | ......................... | H02K 33/12 |
| 9,748,827 B2* | 8/2017 | Dong | ..................... | H02K 33/16 |
| 2002/0195884 A1* | 12/2002 | Ichii | ........................ | A61C 17/34 310/15 |
| 2012/0074796 A1* | 3/2012 | Kobayashi | ............. | H02K 33/16 310/25 |
| 2012/0227269 A1* | 9/2012 | Subramanian | ......... | B26B 19/282 30/210 |
| 2017/0214306 A1* | 7/2017 | Katada | ................... | H02K 33/16 |
| 2018/0026511 A1* | 1/2018 | Akanuma | .............. | H02K 35/02 310/20 |

* cited by examiner

*Primary Examiner* — Forrest M Phillips
(74) *Attorney, Agent, or Firm* — IPro, PLLC; Na Xu

(57) ABSTRACT

A vibrating motor is provided in the present disclosure. The vibrating motor includes a shell, a vibrating module, a magnet module, a coil module and an elastic assembly. The shell provides a receiving cavity for receiving the vibrating module. The vibrating module includes a first vibrating member and a second vibrating member, and the magnet module receives in the vibrating module. The coil module is disposed under the magnet module; the elastic assembly includes a pair of a first elastic parts and a second elastic part. The first elastic parts suspend the vibrating module in the shell; and the second elastic part connects the first vibrating member with the second vibrating member. The magnet module is received in at least one of the first vibrating member and the second vibrating member.

7 Claims, 3 Drawing Sheets

VIBRATION MOTOR

FIELD OF THE DISCLOSURE

The present disclosure generally relates to vibrating motor technologies and, more particularly, to a vibrating motor for providing vibration feedback.

BACKGROUND

Portable consumer products, such as mobile phones, handheld game players, navigation devices and portable multi-media players, generally include vibrating motors for generating vibration feedback. For example, the vibrating motor may be used in a mobile phone for providing system vibrating feedback while receiving an incoming call.

A typical vibrating motor only has a single resonant frequency. However, some of the portable consumer products may requires vibrating motors thereof to generate vibration with different resonant frequency to realize both system vibrating feedback and haptic feedback. The vibrating motor having a single resonant frequency cannot satisfy the above requirement.

Therefore, it is desired to provide a vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
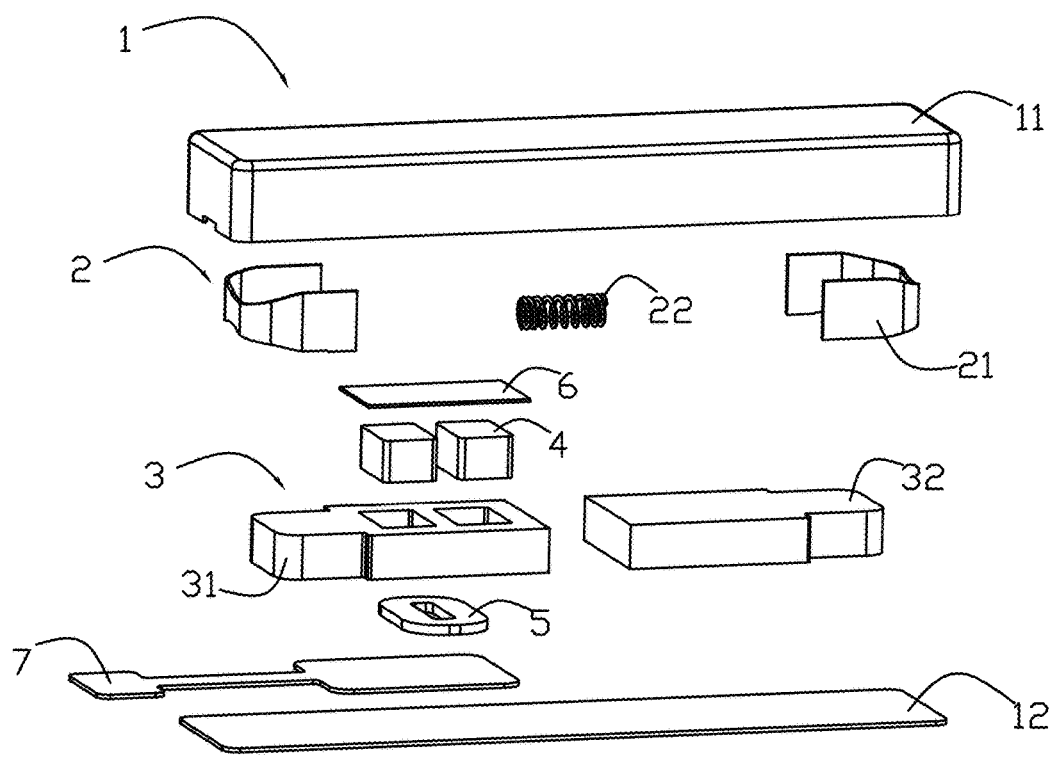
FIG. 1 is an exploded view of a vibrating motor according to a first exemplary embodiment of the present disclosure.
Figure 2:
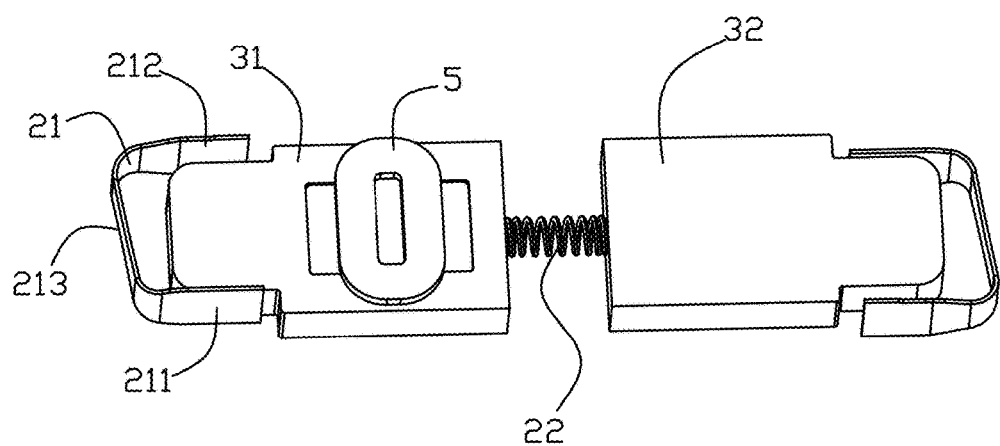
FIG. 2 is a partial, assembled view of the vibrating motor in FIG. 1.
Figure 3:
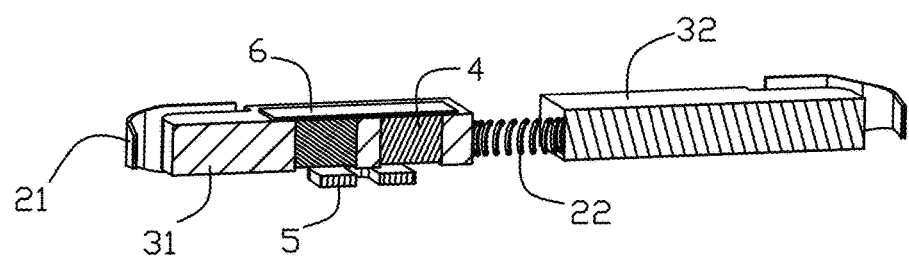
FIG. 3 is a cross-sectional view of the vibrating motor in FIG. 2.

Referring to FIGS. 1-3, a vibrating motor according to a first exemplary embodiment of the present disclosure is shown. The vibrating motor includes a shell 1 providing a receiving cavity, a vibrating module 3 received in the receiving cavity, and an elastic assembly 2 for suspending the vibrating module 3 in the receiving cavity.

The shell 1 has a cuboid-box structure, and includes a main housing 11 and a bottom plate 12 covered by the main housing 11. The bottom plate 12 cooperates with the main housing 11 to form the receiving cavity. A flexible printed circuit board (FPC) 7 is fixed on the bottom plate 12, and is further electrically connected to an external circuit.

Alternatively, the main housing 11 and the bottom plate 12 of the shell 1 may be integrated into a one-piece structure. The shell 1 is not limited to the cuboid-box structure, and the bottom plate 12 may be replaced with a base container corresponding to the main housing 11. In addition, the FPC 7 may be replaced with other component to provide an electrical connecting function, such as a conductive wire.

The elastic assembly 2 includes a pair of first elastic parts 21 and a second elastic part 22. Each of the first elastic parts 21 respectively connects to the shell 1 and an end of the vibrating module 3, and is configured for suspending the vibrating module 3 in the shell 1. The second elastic part 22 is located in the vibrating module 3 and configured for providing internal elastic connection for the vibrating module 3.

Preferably, in the present embodiment, each of the first elastic parts 21 is a U-shaped elastic member, and the second elastic part 22 is a spiral spring. Additionally, each of the first elastic parts 21 includes a first end 211, a second end 212 and a connecting part 213. The connecting part 213 connects the first end 211 with the second end 212. The first end 211 and the second end 212 are respectively connected to a corresponding end of the vibrating module 3 and the shell 1. Alternatively, in another embodiment, both the first elastic parts 21 and the second elastic part 22 may be the U-shaped elastic members, the spiral springs or any other kind of elastic members.

The vibrating module 3 is driven to vibrate along a vibrating direction parallel to a length of the shell 1, and includes a first vibrating member 31 and a second vibrating member 32. The first vibrating member 31 is aligned with the second vibrating member 32 along the vibrating direction. The second elastic part 22 is located between the first vibrating member 31 and the second vibrating member 32.

A mass of the first vibrating member 31 may be the same as that of the second vibrating member 32; and alternatively, the first vibrating member 31 may have different masses. The first elastic parts 21 may have a same elasticity coefficient; and alternatively, the elasticity coefficients of the first elastic parts 21 may be different.

The vibrating motor further includes a magnet module 4, a coil module 5 disposed under the magnet module 4 and a pole module 6 attached to the magnet module 4; the pole module 6 and the coil module 5 are respectively disposed at two opposite sides of the magnet module 4.

In the present embodiment, the coil module 5 and the pole module 6 are respectively a coil and a pole plate. The magnet module 4 is received either in the first vibrating member 31 or the second vibrating member 32. For example, the magnet module 4 includes a pair of permanent magnets, and the first vibrating member 31 includes a pair of receiving holes formed thereon; the pair of permanent magnets is respectively received in the pair of receiving holes of the first vibrating member 31. The coil module 5 is placed on the bottom plate 12 of the shell 1. The pole module 6 covers the magnet module 4 and is configured for providing magnetic shielding for the magnet module 4. The coil module 5 provides a driving force (i.e., a reaction of a Lorentz force) to drive the first vibrating member 31 or the second vibrating member 32 of the vibrating module 3 to vibrate.

As shown in the FIGS. 1-3, in the present embodiment, the magnet module 4 and the coil module 5 are provided corresponding to the first vibrating member 31, and no magnet and coil are provided for the second vibrating member 32. Accordingly, the first vibrating member 31 and the second vibrating member 32 respectively serve as a driving vibrator and a driven vibrator. With this configuration, the first vibrating member 31 is driven to vibrate by the coil module 5, and the vibration of the first vibrating member 31 can further drive the second vibrating member 32 to vibrate via the second elastic part 22.

Alternatively, in another embodiment, the second vibrating member 32 and the first vibrating member 31 may respectively serve as a driving vibrator and a driven vibrator; in this circumstance, the magnet module 4 is received in the second vibrating member 32.

Figure 4:
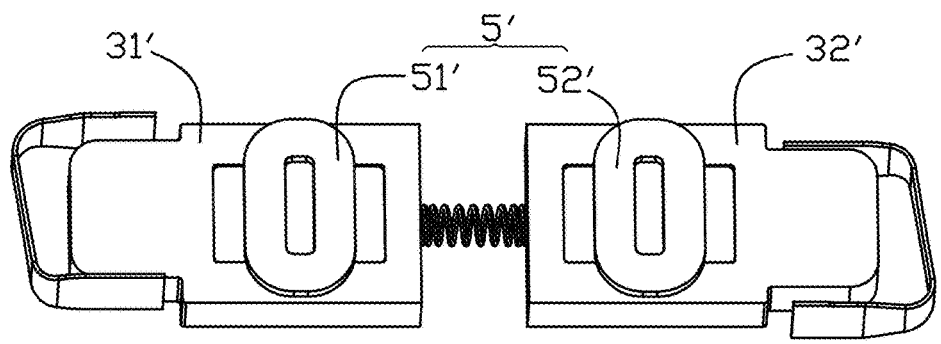
FIG. 4 is a partial, assembled view of a vibrating motor according to a second exemplary embodiment of the present disclosure.
Figure 5:
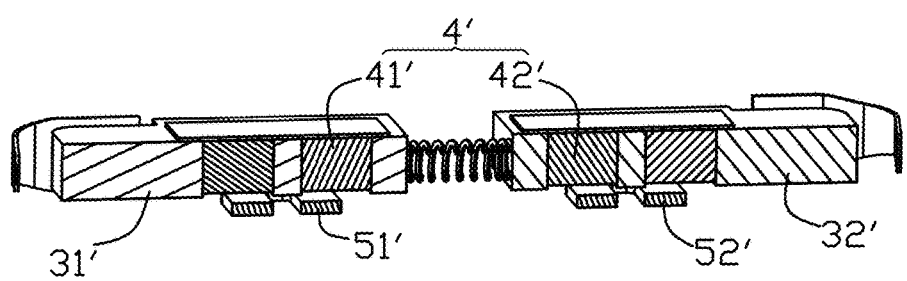
FIG. 5 is a cross-sectional view of the vibrating motor in FIG. 4.

Referring to FIGS. 4-5, a vibrating motor according to a second exemplary embodiment of the present disclosure is shown. The vibrating motor as provided in the second embodiment is similar to the above-described vibrating motor as illustrated in FIGS. 1-3, but differs in the following aspects.

In the second embodiment, a magnet module 4' of the vibrating motor includes a first magnet part 41' and a second magnet part 42', which are respectively received in a first vibrating member 31' and a second vibrating member 32'. Moreover, a coil module 5' of the vibrating motor includes a first coil 51' and a second coil 52', which are respectively disposed under the first magnet part 41' and the second magnet part 42'. The first coil 51' and the second coil 52' are respectively configured for driving the first vibrating member 31' and the second vibrating member 32' to vibrate independently.

Description of the vibrating principle of the vibrating motor as provided in the present embodiment is given below.

Vibrating frequencies $\omega_1$, $\omega_2$ of the first vibrating member 31 and the second vibrating member 32 can be expressed by the following formula:

$$\omega_1^2, \omega_2^2 = \frac{1}{2}\left\{\frac{(k_1+k_2)m_2 + (k_2+k_3)m_1}{m_1 m_2}\right\} \pm$$
$$\frac{1}{2}\left[\left\{\frac{(k_1+k_2)m_2 + (k_2+k_3)m_1}{m_1 m_2}\right\}^2 - 4\left\{\frac{(k_1+k_2)(k_2+k_3) - k_2^2}{m_1 m_2}\right\}\right]^{\frac{1}{2}}.$$

In the above formula, $m_1$ and $m_2$ respectively represent masses of the first vibrating member 31 and the second vibrating member 32; $k_1$ and $k_3$ respectively represent elasticity coefficients of the pair of the first elastic parts 21; $k_2$ represents an elasticity coefficient of the second elastic part 22.

Based on the above formula, it can be found that the vibrating frequency of the vibrating module 3 is an intrinsic characteristic, which is relevant to the mass of the vibrating module 3 and the spring constant of the elastic assembly 2, but irrelevant to the driving force provided by the coil module 5.

In other words, the vibrating frequency of the vibrating module 3 may be changed by adjusting the mass of the vibrating module 3 and the elasticity coefficient of the elastic assembly 2. Because the vibration of the vibrating motor is mainly determined by the vibrating frequency of the vibrating module 3, appropriate vibrating module and elastic assembly can be configured in the vibrating motor as required, such that the vibrating motor is capable of generating different kinds of vibration with different resonant frequencies to meet diverse vibration requirements of the portable consumer products, such as system vibrating feedback and haptic feedback. Therefore, user experience of the portable consumer product in which the vibrating motor is applied can be improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibrating motor, comprising:
   a shell providing a receiving cavity;
   a vibrating module received in the receiving cavity and comprising a first vibrating member and a second vibrating member;
   a magnet module received in the vibrating module; and
   a coil module under the magnet module;
   an elastic assembly comprising a pair of a first elastic parts and a second elastic part;
   wherein the first elastic parts suspend the vibrating module in the shell, the second elastic part connects the first vibrating member with the second vibrating member, the magnet module is received in at least one of the first vibrating member and the second vibrating member, the magnet module comprises a first magnet part and a second magnet part respectively received in the first vibrating member and the second vibrating member, the coil module comprises a first coil and a second coil respectively disposed under the first magnet part and the second magnet part, the first coil and the second coil are respectively configured for driving the first vibrating member and the second vibrating member to vibrate.

2. The vibrating motor as described in claim 1, wherein each of the first elastic parts is a U-shaped elastic member.

3. The vibrating motor as described in claim 1, wherein each of the first elastic parts comprises a first end, a second end and a connecting part, the connecting part connects the first end with the second end; the first end and the second end are respectively connected to a corresponding end of the vibrating module and the shell.

4. The vibrating motor as described in claim 1, wherein the first vibrating member is aligned with the second vibrating member along a vibrating direction, the second elastic part is connected between the first vibrating member and the second vibrating member.

5. The vibrating motor as described in claim 4, wherein and the second elastic part is a spiral spring.

6. The vibrating motor as described in claim 1, wherein vibrating frequencies of the first vibrating member and the second vibrating member are expressed by the following formula:

$$\omega_1^2, \omega_2^2 = \frac{1}{2}\left\{\frac{(k_1+k_2)m_2 + (k_2+k_3)m_1}{m_1 m_2}\right\} \pm$$
$$\frac{1}{2}\left[\left\{\frac{(k_1+k_2)m_2 + (k_2+k_3)m_1}{m_1 m_2}\right\}^2 - 4\left\{\frac{(k_1+k_2)(k_2+k_3) - k_2^2}{m_1 m_2}\right\}\right]^{\frac{1}{2}};$$

Wherein $\omega_1$ and $\omega_2$ respectively represent vibrating frequencies of the first vibrating member and the second vibrating member, $m_1$ and $m_2$ respectively represent masses of the first vibrating member and the second vibrating member; $k_1$ and $k_2$ respectively represent elasticity coefficients of the pair of the first elastic parts; $k_2$ represents an elasticity coefficient of the second elastic part.

7. The vibrating motor as described in claim 1, further comprising a pole module covering the magnet module, the pole module is configured for providing magnetic shielding for the magnet module.

* * * * *